United States Patent [19]

Pollner et al.

[11] Patent Number: 5,308,212

[45] Date of Patent: May 3, 1994

[54] AIRCRAFT TOWING VEHICLE

[75] Inventors: Jürgen Pollner, Munich; Gregor Trummer, Aschering, both of Fed. Rep. of Germany

[73] Assignee: Krauss Maffei Aktiengesellschaft, Munich, Fed. Rep. of Germany

[21] Appl. No.: 930,537

[22] PCT Filed: Jan. 30, 1992

[86] PCT No.: PCT/DE92/00057

§ 371 Date: Sep. 24, 1992

§ 102(e) Date: Sep. 24, 1992

[87] PCT Pub. No.: WO92/13762

PCT Pub. Date: Aug. 20, 1992

[30] Foreign Application Priority Data

Jan. 31, 1991 [DE] Fed. Rep. of Germany ....... 4102861
Sep. 23, 1991 [DE] Fed. Rep. of Germany ....... 4131649

[51] Int. Cl.⁵ .................................. B64F 1/22
[52] U.S. Cl. .................................. 414/428; 414/429; 180/904; 244/50
[58] Field of Search ............. 414/426, 427, 428, 429, 414/430, 458, 459, 590, 563, 546, 474, 475, 476; 280/402; 180/904; 244/50

[56] References Cited

U.S. PATENT DOCUMENTS

| 4,632,625 | 12/1986 | Schuller et al. | 414/429 |
| 4,810,157 | 3/1989 | Schopf | 414/429 |
| 4,911,603 | 3/1990 | Pollner et al. | 414/429 X |
| 4,911,604 | 3/1990 | Pollner et al. | 414/428 |
| 4,917,563 | 4/1990 | Pollner et al. | 414/428 |
| 4,917,564 | 4/1990 | Pollner et al. | 414/428 |
| 4,950,121 | 8/1990 | Meyer et al. | 414/429 X |
| 4,997,331 | 3/1991 | Grinsted et al. | 414/429 |
| 5,051,052 | 9/1991 | Franken et al. | 414/429 X |

Primary Examiner—Frank E. Werner
Assistant Examiner—James T. Eller, Jr.
Attorney, Agent, or Firm—Herbert Dubno; Yuri Kateshov

[57] ABSTRACT

An aircraft towing vehicle including a chassis formed with a recess receiving a towing device for securing a nose wheel of an aircraft and including a transversely tiltable bearing frame, a vertically displaceable and longitudinally swingable lifting cradle provided with a pair of telescopic traction arms having respective gripping devices on respective rearward ends, the arms being longitudinally displaceable and adapted to swing about respective transverse axes, bringing thereby the gripping devices upwardly to engage the circumference of the nose wheel above an axle thereof.

8 Claims, 4 Drawing Sheets

AIRCRAFT TOWING VEHICLE

CROSS-REFERENCE TO RELATED APPLICATIONS

This application is a national phase application of PCT/DE92/00057 filed 30 Jan. 1992 and based upon German National Applications P4102861.9 filed 31 Jan. 1991 and P4131649.5 filed 23 Sep. 1991 under the International Convention.

FIELD OF THE INVENTION

The invention relates to an aircraft towing vehicle provided with a chassis having a receiving device formed on a rear end of the chassis for supporting and securing a nose wheel of an aircraft.

BACKGROUND OF THE INVENTION

In aircraft towing vehicles without a towbar the nose wheel is supported and secured on a support surface designed as a platform, cradle, ramp or the like, provided in the fork-shaped, rearward open recess of the towing vehicle. In order to place the nose wheel on the support surface a take-up operation occurs, consisting mainly of two motion courses. In one variant, the nose wheel is gripped from behind by a gripping and traction device travelling back and forth on the towing vehicle in longitudinal direction and pulled onto the support surface which is basically stationarily mounted on the towing vehicle, such as known from German open specifications 33 18 077, 37 01 971 and 18 01 855. During this take-up operation the aircraft and the towing vehicle have to move relatively to each other, whereby due to the big difference in mass the aircraft stands still, preferably with set landing-gear brakes, while the towing vehicle moves in reverse during the take-up, until the support surface is positioned under the nose wheel In the other variant of the take-up operation both the aircraft and the towing vehicle are stationary relatively to each other and the support surface is moved backwards with respect to the towing vehicle and slipped under the nose wheel. A countersupport reaching behind the nose wheel takes care of the securing of the nose wheel with respect to the towing vehicle and prevents strain on the nose wheel gear due to horizontal forces acting on the nose wheel while the support surface is slipped under the latter. Towing vehicles of this kind are known from DE-OS 39 17 255 and EP 0 331 363 A1.

The invention relates to a towing vehicle of the kind first mentioned, wherein the nose wheel is gripped from the rear by a gripping device and pulled onto the support surface. A towing vehicle is known particularly from EP 0 276 779 A1. In this known towing vehicle the lifting cradle having the support surface is supported on the chassis so that it is swingable about a horizontal transverse axis and the traction arms carrying the gripping members are rigidly connected with the lifting cradle, so that when the lifting cradle is raised or lowered they will be moved up or down to the same extent, and that especially when the lifting cradle is raised they will move together with the same and the nose wheel. Since in this known towing vehicle the position of the gripping members does not change with respect to the lifting cradle during the raising and lowering operation, the gripping member presses against the same location on the nose wheel circumference when the lifting cradle is lowered, as well as when the lifting cradle is raised. If this location is above the axis of rotation of the nose wheel, the gripping member can exert a downwardly oriented holding force on the nose wheel, however there is the disadvantage that the downwardly oriented force component already exists when the nose wheel is supposed to be pulled onto the lowered lifting cradle. This is a drawback, since during the take-up it is desirable to have a force component which is again upwardly oriented, helping to overcome the difference in height between the runway and the lowered lifting cradle. From DE-OS 39 17 255 a towing vehicle is known which has an actively rearward slidable lifting cradle and therefore pertains to the above-mentioned second variant of the take-up operation, wherein traction arms bearing the gripping members reaching behind the nose wheel can be swung vertically independently from the lifting cradle, so that the gripping members can be applied against any desired location on the nose wheel circumference. However, additional hydraulic adjusting cylinders with corresponding control units are required, which increases the complexity and vulnerability of the entire pickup device. Further, both previously mentioned towing vehicles have the disadvantage that the lifting cradle and the traction arms are horizontally swingable o the towing vehicle about rigidly established axes, thereby not having any freedom of movement with respect to the longitudinal axis of the towing vehicle This means that the towing vehicle is under unilateral strain due to the load of the nose wheel positioned eccentrically with respect to the vehicle's longitudinal median plane, which can impair its travel capabilities. Such an eccentric strain exerted by the nose wheel can be the result of an inaccurately centered positioning of the nose wheel on the support surface on the one hand, and on the other hand of the fact that when the vehicle turns, due to normally longitudinally inclined longitudinal axis of the nose wheel, a steering angle of the nose wheel is combined with a weight displacement towards the inside of the curve. From the already mentioned EP 0 276 779 A1 an embodiment of the towing vehicle is known wherein the lifting cradle is raisably and lowerably guided on the chassis via four guide rods arranged in a parallelogram, whereby these guide rods allow for inclinations of the lifting cradle with respect to the longitudinal axis of the vehicle; however, transverse motions of the lifting cradle in order to center an eccentrically picked up nose wheel are not possible.

OBJECT OF THE INVENTION

It is the object of the invention to develop a towing vehicle with the simple constructive and control means for providing a gentle pickup and a safe securing of the nose wheel on the lifting cradle, as well as an optimal adjustment to different nose wheel diameters and to eccentric strain by the nose wheel.

SUMMARY OF THE INVENTION

The particular advantage of the towing vehicle of the invention consists on one hand in the entire receiving assembly comprising the lifting cradle and the traction arms and fitted on a transversely shiftable and tiltable bearing frame and transversely displaceable for centering an eccentrically picked up nose wheel, as well as in adjusting the inclinations of the nose wheel when traveling through turns. On the other hand the advantage of the towing vehicle of the invention consists in the fact that each of the traction arms is swingable about its own horizontal axis, the arms are coupled with the lifting cradle in such a way that they pivot vertically when the lifting cradle is raised, whereby the gripping members move upwardly to a greater extent than the lifting cradle, so that during the lifting motion the attack point of the gripping members on the nose wheel circumference is displaced upwards, therefore a special actuation drive for this translated vertical motion of the gripping members with respect to the lifting cradle is not required. Besides, the further the extension of the traction arms, i.e. the larger the diameter of the nose wheel, the greater the vertical motion of the gripping members is. This means that in the case of smaller nose wheels, as well as in the case of larger nose wheels, the displacement of the attack point of the gripping members on the nose wheel circumference is always correct.

According to the invention a further modification of the structure is directed to the gripping members each having a downholder pivotable about a horizontal axis which is actuated by a pressure device to exert additional downclamping force on the nose wheel.

Still another advantage of the present invention is reflected by the structure of the towing vehicle further including a pressure control for selective actuation of the hydraulic cylinder of the traction arms and the pressure device after the nose wheel is received in the cradle, the downholder with a predetermined continuous pressure in order to exert a predetermined clamping force on the nose wheel, and including at least one sensor for detection of an extension position of the traction arms whereby the pressure control selects higher or lower values for the continuous pressure depending on a shorter or longer extension respectively.

Yet another embodiment according to the invention is the traction arm comprising:

- a tubular guide with a noncircular cross section, supported swingably about a bearing axle;
- a cylinder guided longitudinally slidable but nonrotatably within the tubular guide, a noncircular guiding element;
- a piston arranged in the cylinder having a piston rod nonslidably fastened to the tubular guide and which contains pressure-medium channels operably connected to the working chambers on both side of the piston, through which pressure-medium serving for displacement of the cylinder is supplied and evacuated.

Another embodiment according to the invention characterized in that the tubular guide is coupled with the lifting cradle through the joint plate.

Further embodiment according to the invention is the towing vehicle wherein the distance between the bearing axles of each traction arm and the joint plate is selected in relation to a lifting stroke of the lifting cradle and an extension length of the traction arm corresponding to a respective nose wheel diameter, so that swinging motion performed by each traction arm while the lifting cradle is raised brings the respective gripping member from a position located below an axle of the nose wheel to a position located above the axle of the nose wheel.

According to still another embodiment of the invention the towing vehicle further comprises the bearing frame suspended on each of its longitudinal sides by an angled fishplate which forms a two-arm angular lever, whose one lever arm is pivotally connected with the bearing frame, while the other downwardly projecting lever arms of the two angled fishplates are connected to each other by a coupling rod extending along a transverse direction of the towing vehicle so that the lever arms, the bearing frame and the coupling rod together form a minimally limited freely deformable four-bar linkage.

And, finally, the towing vehicle according to another embodiment further includes the angled fishplate suspended via a further fishplate from a corresponding chassis flank, whereby pivot points of the fishplates at the chassis and at the angled fishplates form at least approximately a linkage parallelogram, during the deformation of which the bearing frame is displaced transversely with respect to the chassis, and including a servo drive for centering and securing the bearing frame in the transverse direction of the chassis.

According to an especially preferred embodiment of the invention, the clamping force by means of which the gripping members secure the nose wheel to the lifting cradle after the conclusion of the lifting operation is established by a pressure control unit, depending on the extension of the traction arms, and thereby depending on the diameter of the nose wheel. This feature is based on the fact that nose wheels of larger diameter normally belong to larger and heavier aircraft and therefore require a higher clamping force than nose wheels of smaller diameter.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
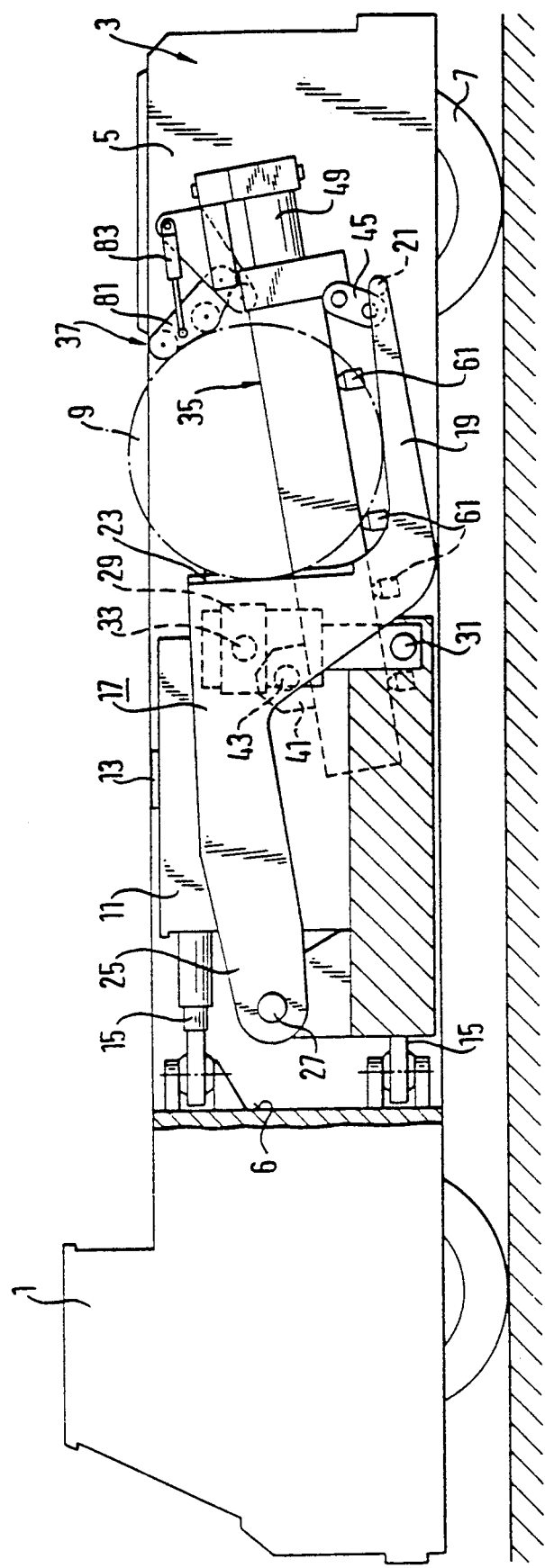
FIG. 1 is a schematic longitudinal section through a towing vehicle according to an embodiment of the invention with raised lifting cradle.

The towing vehicle for the manoeuvering of aircraft without a towbar schematically shown in FIG. 1 has a chassis 1 with a fork-shaped recess in the rear, so that a rearward open cutout 3 is created, which is defined on each of its two sides by a flank 5 of the chassis which also supports the corresponding rear wheel 7 of the vehicle. In the recess 3 a further described receiving device is located, by means of which the nose wheel 9 of an aircraft can be seized, lifted and secured. The entire receiving assembly is fitted on a bearing frame 11 which is supported within the recess 3 on each vehicle chassis flank 5 by means of bilaterally arranged guide rod suspensions 13. These guide rod suspensions 13, which will be further described in more detail, make possible the tilting motions of the bearing frame 11 about a horizontal axis running in longitudinal direction of the vehicle 1 and limited transverse shifting motions of the frame 11 with respect to the chassis. In the longitudinal direction of the vehicle, the bearing frame 11 is supported against the frontal wall 6 of the chassis bordering the recess 3 by four guide rods 15 forming a parallelogram, which does not hamper the transverse movements of bearing frame 11. Preferably the guide rods 15 are length-adjustable.

For receiving and supporting the nose wheel 9 a lifting cradle 17 is provided. The cradle has an approximately horizontally directed support platform 19 whose rearward oriented free edge can be provided with one or several rolls 21 in order to facilitate the take-up operation. Further the lifting cradle 17 has an approximately vertical stopping surface 23 for the nose wheel and is supported pivotably about a horizontal axis 27 on corresponding support brackets in the frontal area of the bearing frame 11 by means of forwardly oriented lateral walls 25. For raising and lowering the lifting cradle 17 a hydraulic piston-cylinder assembly 29 is provided, which is linked to the bearing frame 11 in linking point 31, respectively to the lifting cradle 17 in linking point 33.

Also on the bearing frame 11 two telescopic traction arms 35 are swingably supported, these arms extending parallelly with respect to the vehicle axis towards the rear, on both sides of the lifting cradle 17, immediately adjacent to the wall of the chassis flank 5 and bearing at each of their free ends a gripping member 37 by means of which the nose wheel is gripped from behind, pulled onto the platform 19 of the lifting cradle 17 and clamped against the latter and the stopping surface 23. The lifting arms 35 are arranged and shaped symmetrically with respect to the longitudinal median plane of the towing vehicle 1, and for this reason only one of the lifting arms 35 is shown in the drawing and described herebelow.

Figure 4:
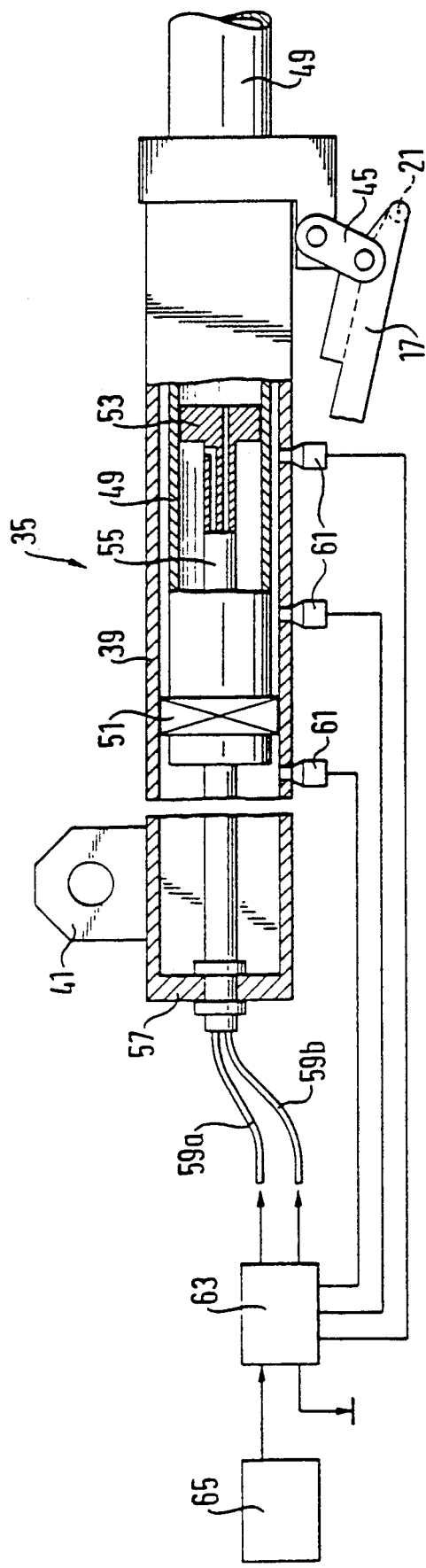
FIG. 4 is a schematic longitudinal section through a traction arm.

As can be seen from FIG. 1 in conjunction with FIG. 4, each traction arm 35 has a tubular guide 39 with a quadrangular cross section which is supported on a horizontal bearing axle 43 (FIG. 1) of the bearing frame 11 by means of a support plate 41, thereby being swingable in a vertical plane. At its free end the tubular guide 39 is linked via a joint plate 45 with the lifting cradle 17 close to its frontal edge. In the tubular guide 39 the cylinder 49 of a hydraulic piston-cylinder unit is slidably guided, namely by means of a slide ring 51 surrounding the cylinder 49 and rigidly connected thereto and having a quadrangular contour adjusted to fit the inner cross section of the tubular guide 39. The cylinder 49 is thereby longitudinally slidable but nonrotatably guided inside the tubular guide 39. This is important because during the clamping of the nose wheel gripping member 37 carried by the cylinder 49 exerts not only a traction force in the longitudinal direction of cylinder 49, but also a torque around the cylinder axis, which has to be compensated at the bearing frame 11 via the tubular guide 39 and its articulated supports 41, 43.

In the cylinder 49 there is a stationary piston 53, whose piston rod 55 is rigidly fastened to the end wall 57 of the tubular guide 39. Inside the piston rod 55 pressure-medium channels discharging in front of, respectively behind the piston 53, are provided. By supplying pressure medium to the connections 59a, 59b of these channels, pressure medium can be directed to one or the other side of the piston 53, thereby pushing the cylinder 49 in FIG. 4 to the right or to the left, in order to either lengthen or shorten the entire telescopic traction arm 35.

As can be further seen from FIG. 4, on the walling of the tubular guide 39 longitudinally spaced apart sensors 61 are arranged, which detect the extended position of the cylinder 49. These sensors can, for instance, be designed like switches which are actuated by slide ring 51 or they can be contactless sensors. The signals from sensors 61 reach a pressure control 63 which can limit to a maximal value the hydraulic pressure supplied by a hydraulic control 65 for the shortening of the telescopic arm, whereby several maximal values are available which are selected corresponding to the signals coming from sensors 61. The farther the cylinder 49 extends outside the tubular guide 39, the higher is the selected maximal value. This pressure control can for instance be exerted by a number of pressure control valves (not shown in the drawing) with variably set opening pressure, which are selectively actuated by the pressure control unit 63.

Figure 2:
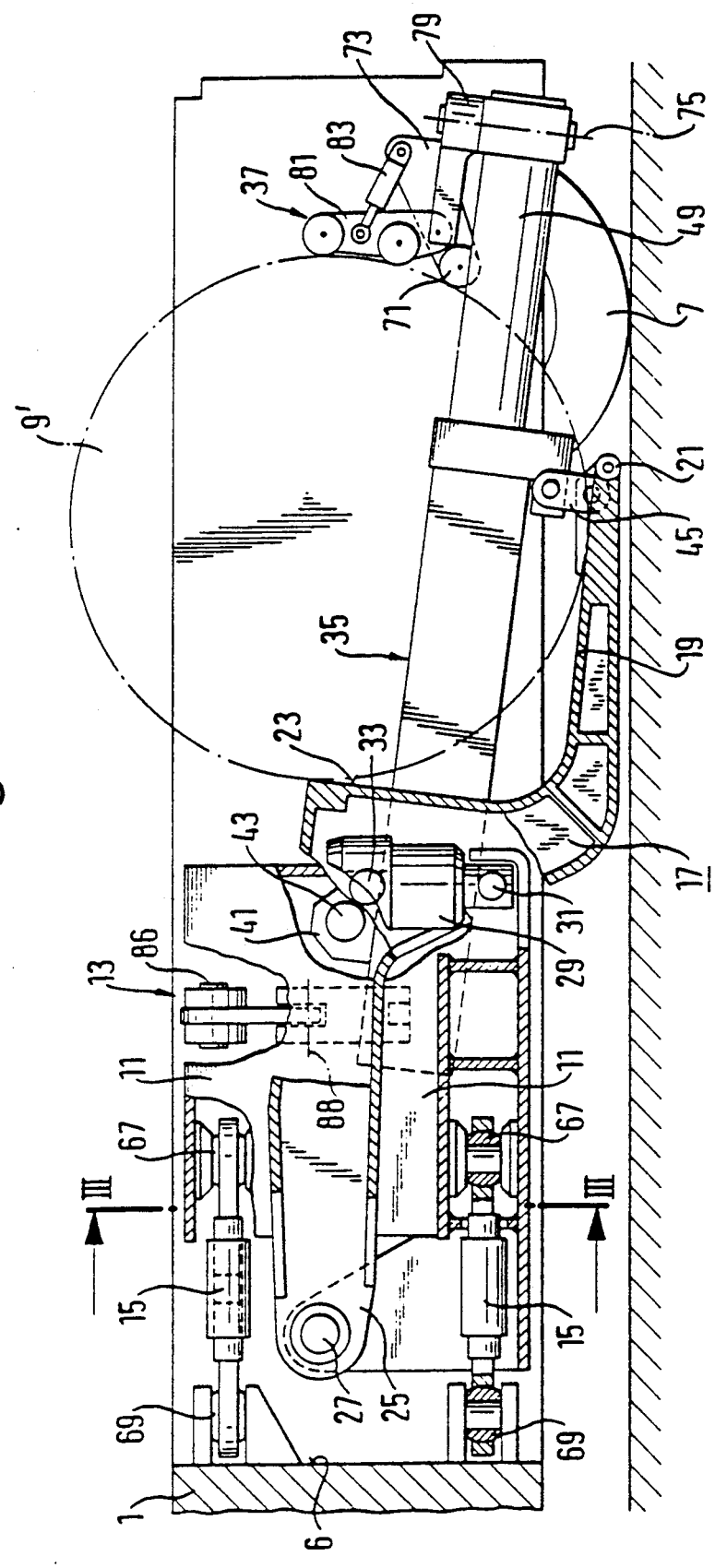
FIG. 2 is a section similar to FIG. 1 with lowered lifting cradle and showing additional details.

While in FIG. 1 the towing vehicle 1 is shown with raised lifting cradle and a clamped nose wheel 9 with small diameter, FIG. 2 shows the receiving device of the towing vehicle 1 with a lowered lifting cradle during the take-up of a nose wheel 9' with a larger diameter. In FIG. 2 further additional details are shown. So, for instance, it can be seen from FIG. 2 that the bearing frame 11 is a box-like welded structure and has spherical bearings 67 for the length-adjustable guide rods 15, which are also supported in spherical bearings 69 on the frontal wall of the chassis recess 3.

The gripping member 37 mounted at the end of the telescopic cylinder 49 consists mainly of a support roll 71 supported on a carrier 73 which is pivotable about an approximately vertical axis 75, namely by means of a hydraulic torque motor 79. Thereby the entire gripping member can be brought in a position which is parallel to the axis of the cylinder, in order not to hinder the passage of the nose wheel 9 into the recess 3. On the carrier 73 above the roller 71 a roller bracket 81 is swingably supported, serving as a holding-down clamp and carrying two or more rollers and which can be pressed by means of a hydraulic cylinder 83 against the circumference of the nose wheel 9, in order to exert thereon an additional downclamping force with a downwards oriented force component.

Figure 3:
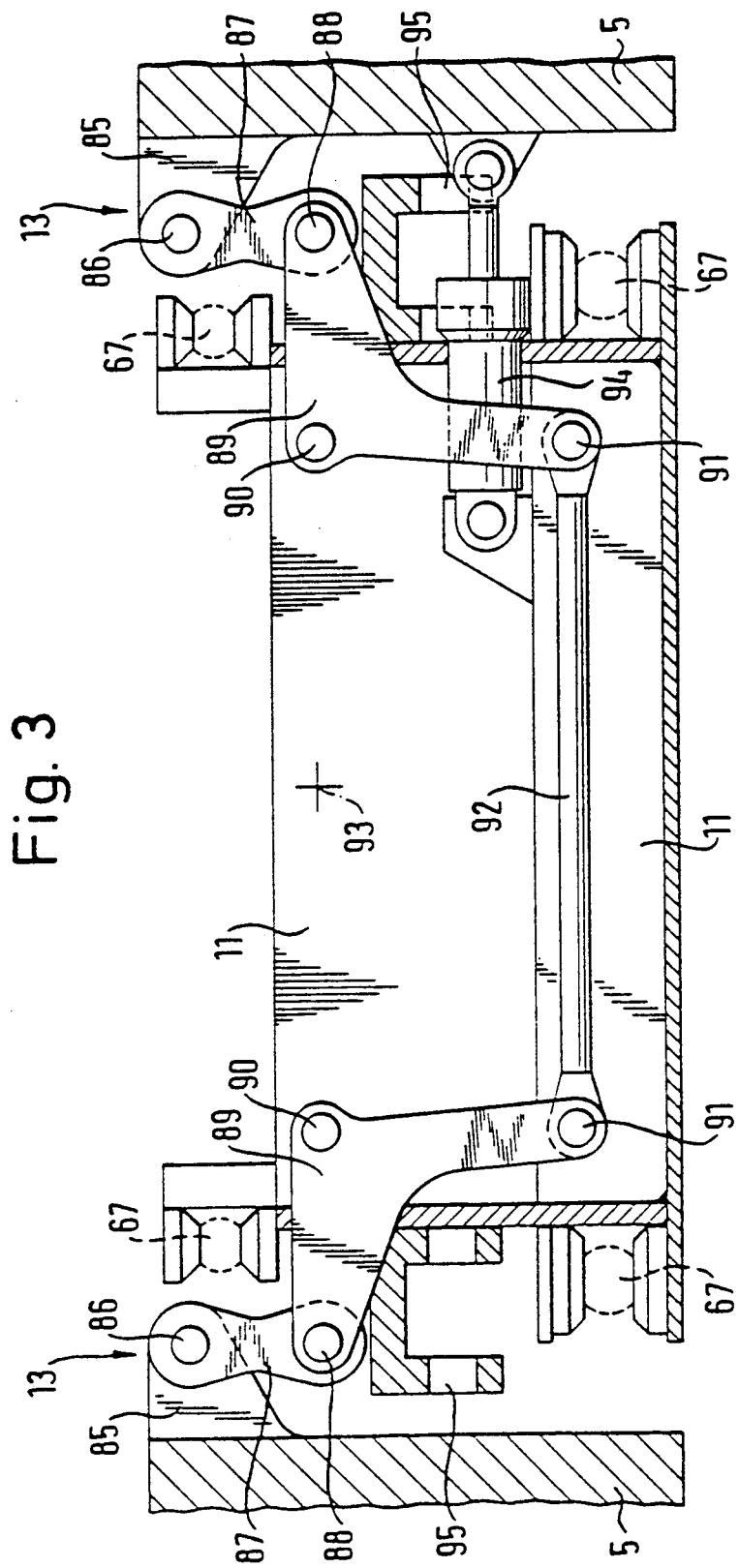
FIG. 3 is a schematic and simplified sectional view according to line III—III of FIG. 2.

FIG. 3 shows in cross section the details of the articulated suspension 13 for the bearing frame 11. The latter is shown in a simplified manner and particularly the lifting cradle 17 and the traction arms 35 are omitted. On each of the two chassis flanks 5 an inwardly projecting support bracket 85 is arranged, wherefrom a fishplate 87 is suspended which is pivotable about an articulated axle 86. At the lower end of each of the fish plates 87 an angular or triangular fishplate 89 is supported pivotably about an articulated axle 88, and the bearing frame 11 is suspended in pivot bearing 90 on each of these plates. Between the articulated axles 88, 90, each triangular fishplate 89 forms a basically horizontal lever arm. At the lower end of each triangular fishplate 89 a coupling rod 92 rotatable about an articulated axle 91 is supported, connecting the two triangular fishplates 89 in a traction-resistant manner. The triangular plates 89 and the coupling rods 92 form a four-bar linkage with the corners in the pivot bearings 90, 91. Due to the free deformability of this four-bar linkage in the hinge points 90, 91, the bearing frame 11 can perform twisting and tilting motions about a virtual longitudinal axis, which can lie approximately at 93, thereby adjusting to possible inclinations of the received nose wheel. The upper fishplates 87 together with the bearing frame 11 suspended therefrom via the triangular fishplates 89 form a linkage parallelogram with the hinge points at the articulated axles 86, 88. By means of this linkage parallelogram the bearing frame 11 can be displaced transversely to the chassis by remaining essentially parallel within itself. A hydraulic setting cylinder 94 is linked on the one side to the bearing frame 11 and on the other side to one chassis flank 5 and serves for the transverse displacement of the bearing frame 11. Thus it is possible to center the receiving device with respect to the nose wheel to be received. When during the approach of the nose wheel 9 by the towing vehicle 1 the nose wheel is not exactly in the middle of the recess 3, by actuating the hydraulic cylinder 92 it is possible to bring the bearing frame 11 and with it the entire receiving device also into an eccentric position and to center it with respect to the nose wheel. After the nose wheel has been received, it is then possible by actuating the hydraulic cylinder 94 to bring the entire receiving device containing the nose wheel in a centered position with respect to the chassis.

It can also be seen from FIG. 3 that the bearings 67 for the guide rod 15 (FIG. 1) longitudinally supporting the bearing frame 11 are formed by outwardly projecting brackets. Also, laterally projecting bearing eylets 95 are provided for receiving the horizontal bearing axles 43 serving for the traction arms 35 (not shown in FIG. 3).

The receiving of a nose wheel with the towing vehicle of the invention takes place as follows. By means of the lifting cylinder 29 the lifting cradle 17 is lowered to its lowermost position wherein it is located immediately above the runway. The cylinders 49 of the traction arms 35 are extended to their full length, and, advantageously so far that the gripping members 37 are outside the recess 3 of vehicle 1, so that the chassis flanks 5 do not hinder the gripping member 37 from swinging out to a position parallel to the traction arms 35. The towing vehicle is driven in reverse to approach the nose wheel gear until the roller 21 on the free edge of the lifting cradle platform 19 touches the nose wheel. This can be picked up by a sensor which then controls the automatic interruption of the reverse motion and triggers the automatically run receiving operation. Then the gripping members 37 are swung by torque motors 79 into the position wherein they grip the nose wheels from behind and the cylinders 49 of the traction arms 35 are moved towards the connection 59a (FIG. 4) by pressure-medium supply, so that the pressure rollers 31 seize the nose wheel and move it up onto the cradle platform 19. Since the traction arms 35 are coupled with the lifting cradle, the attack point of the pressure roller 71 lies in the lower quadrant of the nose wheel circumference, so that the traction force has an upwardly directed component which assists the receiving of the nose wheel on the cradle platform 19. When the nose wheel hits against the stopping surface 23, which again can be picked up by a sensor, by actuating the lifting cylinder 29 the lifting cradle 17 is raised, until it reaches its upper position (FIG. 1) with maximal freedom with respect to the ground. Thereby the traction arms 35 coupled with the lifting cradle 17 via joint plate 45 are swung upwardly about the pivot axis 43. Thereby the gripping member 37 travels a longer upward path than the cradle platform 19, so that the attack point of the pressure roller 71 on the nose wheel 9 is displaced upwards, above the rotation axis of the nose wheel. The vertical path of the gripping member 37 depends on the ratio between the distances between the bearing axle 43 and the joint plate 45, respectively between the joint plate 45 and the gripping member 37, and is therefore bigger when the cylinder 49 of the traction arm 35 is farther extended. Therefore compared to small nose wheels, in the case of nose wheels with large diameters a stronger upward displacement of the pressure roller 71, respectively of the entire gripping member 37 occurs.

After the receiving operation is concluded, the cylinder 49 is actuated with a predetermined hydraulic pressure via the pressure-medium connection 59a, in order to secure the nose wheel 9 on the lifting cradle 17 with a preselected clamping force. As already explained, the value of this predetermined clamping pressure is selected by the pressure control 63 from several predetermined values, namely corresponding to the extension length of cylinder 49 as detected by sensors 61, which in turn depends on the diameter of the received nose wheel 9, respectively 9'. Therefore nose wheels with a larger diameter are subjected to a bigger clamping force than small nose wheels. Normally bigger and heavier aircraft have also nose wheels with a larger diameter than aircraft of a smaller type. This way by increasing the clamping force with the increase of the nose wheel diameter, nose wheels of larger and heavier aircraft are secured to the towing vehicle with a correspondingly high clamping force, while on the other hand it can be avoided that smaller nose wheels are subjected to an unnecessarily high clamping force.

By actuating the hydraulic cylinder 83 with pressure medium (via supply ducts not shown in the drawing) the rollers of the roller bracket 81 can be pressed against the nose wheel circumference so that the roller bracket 81 acts as a downclamping device, in order to exert an additional downwardly directed downclamping force on the nose wheel 9, respectively 9'. Thereby the downclamping force exerted by the downholder 81 can be selected independently from the clamping force exerted by means of hydraulic cylinder 79 and the pressure roller 71. Preferably the pressure supplied to the hydraulic cylinder 83 by the pressure control 63 depending on the extension length of the traction arms 37 is selected so that the downclamping force is higher the larger the nose wheel diameter is.

The described operations taking place during the receiving of the nose wheel can be automated by means of automatic sequence control, so that they can take place automatically to a large extent, depending on sensor signals and end position detectors, i.e. without continuous intervention by the driver of the towing vehicle.

We claim:

1. Towing vehicle for towing an aircraft comprising: a chassis having a fork shaped recess at a rear portion thereof, a receiving device arranged in the recess for supporting and securing a nose wheel of an aircraft, a lifting cradle supported for swinging movement about a horizontal axis while being constrained against sliding movement in a longitudinal direction, a lifting device for raising and lowering said lifting cradle, two telescopic traction arms arranged on both sides of the lifting cradle, said traction arms being mechanically coupled with the lifting cradle for a linked vertical motion, hydraulic cylinder means for extending and retracting said traction arms, located at free end portions of said traction arms for reaching behind the nose wheel, whereby shortening of the traction arms pulls the nose wheel onto the lowered lifting cradle and secures the nose wheel thereto, wherein the recess of the chassis comprises a bearing frame supporting said lifting cradle and said traction arms guide rod suspensions for supporting the bearing frame arranged on both sides thereof, so that the bearing frame can twist and tilt in a transverse direction;

wherein the lifting cradle and the traction arms are supported swingably on the bearing frame about different horizontal bearing axles longitudinally offset with respect to each other;

and wherein each traction arm is coupled with the lifting cradle via a joint plate for allowing pivoting motions about their respective bearing axles during vertical motions of the lifting cradle, whereby the gripping members travel over a larger upward path than the lifting cradle when said lifting cradle is elevated.

2. Towing vehicle according to claim 1 wherein each gripping member has a downholder pivotable about a horizontal axis which is actuated by a pressure device to exert additional downclamping force on said nose wheel.

3. Towing vehicle according to claim 2, further comprising a pressure control for selective actuation of the hydraulic cylinder of the traction arms and the pressure device after the nose wheel is received in said cradle, said pressure control controlling the downholder with a predetermined continuous pressure in order to exert a predetermined clamping force on the nose wheel, and including at least one sensor for detection of an extension position of the traction arms, whereby the pressure control selects higher or lower values for the continuous pressure depending on a shorter or longer extension respectively.

4. Towing vehicle according to claim 1, wherein each traction arm comprises:

a tubular guide with a noncircular cross section, supported swingably about a bearing axle;

a cylinder guided longitudinally slidable but nonrotatably within the tubular guide, a noncircular guiding element for guiding said cylinder;

a piston arranged in the cylinder having a piston rod nonslidably fastened to the tubular guide and which contains pressure-medium channels operably connected to the working chambers on both sides of the piston, through which pressure-medium serving for displacement of the cylinder is supplied and evacuated.

5. Towing vehicle according to claim 4, wherein the tubular guide is coupled with the lifting cradle through the joint plate.

6. Towing vehicle according to claim 1, wherein the distance between the bearing axles of each traction arm and the joint plate is selected in relation to a lifting stroke of the lifting cradle and an extension length of the traction arm corresponding to a respective nose wheel diameter, so that swinging motion performed by each traction arm while the lifting cradle is raised brings the respective gripping member from a position located below an axle of the nose wheel to a position located above the axle of the nose wheel.

7. Towing vehicle according to claim 1, wherein the bearing frame is suspended on each of its longitudinal sides by an angled fishplate which forms a two-arm angular lever, whose one lever arm is pivotally connected with the bearing frame, while the other downwardly projecting lever arms of the two angled fishplates are connected to each other by a coupling rod extending along a transverse direction of the towing vehicle so that the lever arms, the bearing frame and the coupling rod together form a minimally limited freely deformable four-bar linkage.

8. Towing vehicle according to claim 7, wherein each angled fishplate is suspended via a further fishplate from a corresponding chassis flank, whereby pivot points of the fishplates at the chassis and at the angled fishplates form at least approximately a linkage parallelogram, during the deformation of which the bearing frame is displaced transversely with respect to the chassis, and including a servo drive for centering and securing the bearing frame in the transverse direction of the chassis.

* * * * *